US010972958B1

(12) United States Patent
Wang et al.

(10) Patent No.: US 10,972,958 B1
(45) Date of Patent: Apr. 6, 2021

(54) LOCATION-BASED ROUTE MANAGEMENT FOR VEHICLE-TO-EVERYTHING RELAY COMMUNICATIONS

(71) Applicant: AT&T INTELLECTUAL PROPERTY I, L.P., Atlanta, GA (US)

(72) Inventors: Xiaoyi Wang, Austin, TX (US); Salam Akoum, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/809,768

(22) Filed: Mar. 5, 2020

(51) Int. Cl.
*H04W 40/20* (2009.01)
*H04W 4/029* (2018.01)
(Continued)

(52) U.S. Cl.
CPC ........... *H04W 40/20* (2013.01); *H04L 1/1819* (2013.01); *H04L 67/18* (2013.01); *H04W 4/029* (2018.02);
(Continued)

(58) Field of Classification Search
CPC ..... H04W 40/20; H04W 40/02; H04W 4/029; H04W 64/003; H04W 4/08; H04W 4/44;
(Continued)

(56) References Cited

U.S. PATENT DOCUMENTS 4,831,526 A 5/1989 Luchs et al.
7,123,617 B1 10/2006 Abrol
(Continued)

FOREIGN PATENT DOCUMENTS

WO 2010/053347 A2 5/2010
WO 2011/083389 A1 7/2011
(Continued)

OTHER PUBLICATIONS

Alshaer, et al., "An adaptive broadcast scheme for intervehicle communication," Conference Paper—Jan. 2005, DOI: 10.1109/VETECS.2005.1543865—Source: IEEE Xplore, 6 pages.
(Continued)

*Primary Examiner* — Michael Y Mapa
(74) *Attorney, Agent, or Firm* — Amin, Turocy & Watson, LLP

(57) ABSTRACT

The subject matter described herein is directed towards a technology that increases the reliability of transmitting information, by propagating received information in a location-controlled and route managed multiple-stage chain communication in a wireless communication system. A transmitting device transmits a broadcast or group-cast communication message in conjunction with transmitter and receiver location data (e.g., absolute or quantized coordinates). An intermediate device that receives the communication message determines a communication path based on the received location data, and determines whether the intermediate device is within the communication path based on its own location. Only intermediate devices that are within the communications path, and that otherwise satisfy retransmission policy, perform the retransmission. In one aspect, the communication path that is determined can be shaped based on one or more other factors, such as whether the communication message is highly reliable data traffic.

20 Claims, 12 Drawing Sheets

(51) Int. Cl.
*H04W 64/00* (2009.01)
*H04W 4/08* (2009.01)
*H04L 29/08* (2006.01)
*H04W 4/44* (2018.01)
*H04L 1/18* (2006.01)

(52) U.S. Cl.
CPC .............. *H04W 4/08* (2013.01); *H04W 4/44* (2018.02); *H04W 64/003* (2013.01)

(58) Field of Classification Search
CPC .......... H04W 4/46; H04W 88/04; H04B 7/14; H04L 67/18; H04L 1/1819; H04H 20/02; H04H 20/53
USPC .... 455/11.1–13.1, 41.2, 412.1–412.2, 414.1, 455/456.1–457
See application file for complete search history.

(56) References Cited

U.S. PATENT DOCUMENTS

| | | |
|---|---|---|
| 7,653,010 B2 | 1/2010 | Ensor et al. |
| 7,880,861 B2 | 2/2011 | Pouls |
| 8,130,731 B2 | 3/2012 | Hollick et al. |
| 8,149,748 B2 | 4/2012 | Bata et al. |
| 8,274,928 B2 | 9/2012 | Dykema et al. |
| 8,401,878 B2 | 3/2013 | Stender et al. |
| 8,488,482 B2 | 7/2013 | Clave et al. |
| RE44,606 E | 11/2013 | Herz et al. |
| 8,929,228 B2 | 1/2015 | Budampati et al. |
| 8,995,454 B2 | 3/2015 | Hemli et al. |
| 9,078,292 B1 | 7/2015 | Mullen |
| 2006/0023713 A1 | 2/2006 | Choi et al. |
| 2012/0327840 A1 | 12/2012 | Chen et al. |
| 2016/0047884 A1* | 2/2016 | Zhang .................. H04B 7/0617 342/458 |
| 2016/0081055 A1* | 3/2016 | Chika ................... H04W 16/26 370/315 |
| 2016/0285595 A1 | 9/2016 | Chen et al. |
| 2017/0188290 A1 | 6/2017 | Hayee et al. |
| 2017/0347394 A1 | 11/2017 | Yasukawa et al. |
| 2018/0054717 A1 | 2/2018 | Navalekar et al. |
| 2018/0109993 A1 | 4/2018 | Kwan et al. |
| 2018/0197249 A1 | 7/2018 | Lehman et al. |
| 2019/0020381 A1 | 1/2019 | Tooher et al. |
| 2019/0215872 A1 | 7/2019 | Park et al. |
| 2019/0349138 A1 | 11/2019 | Hosseini et al. |
| 2019/0363843 A1 | 11/2019 | Gordaychik |
| 2019/0372653 A1* | 12/2019 | Chae ........................ H04B 7/14 |
| 2019/0387378 A1* | 12/2019 | Willis .................... H04L 67/12 |
| 2020/0059322 A1 | 2/2020 | Lei et al. |
| 2020/0145165 A1 | 5/2020 | Yang et al. |
| 2020/0236655 A1* | 7/2020 | Bharadwaj ........... H04B 17/318 |

FOREIGN PATENT DOCUMENTS

| | | |
|---|---|---|
| WO | 2014/054123 A1 | 4/2014 |
| WO | 2015/032436 A1 | 3/2015 |
| WO | 2016/126319 A1 | 8/2016 |
| WO | 2017/007104 A1 | 1/2017 |
| WO | 2017/033486 A1 | 3/2017 |
| WO | 2018/068817 A1 | 4/2018 |
| WO | 2018/092961 A1 | 5/2018 |
| WO | 2018/093381 A1 | 5/2018 |

OTHER PUBLICATIONS

Hrizi, et al., "On Congestion-Aware Broadcasting in V2X Networks," 2009 IEEE, 8 pages.

Kanrar, "Efficient Packet Forwarding in Mesh Network," Article in International Journal of Interactive Mobile Technologies (iJIM)—May 2012, 5 pages.

Mostafa, et al., "A probabilistic routing by using multi-hop retransmission forecast with packet collision-aware constraints in vehicular networks," 2013 Elsevier B.V, http://dx.doi.org/10.1016/j.adhoc.2013.11.012, 12 pages.

Suthaputchakun, et al., "Multi-Hop Broadcast Protocol in Intermittently Connected Vehicular Networks," Manuscript submitted Nov. 27, 2015, 36 pages.

Non-Final Office Action received for U.S. Appl. No. 16/372,887 dated Jun. 5, 2020, 55 pages.

Zheng, K., et al., "Heterogeneous Vehicular Networking: A Survey on Architecture, Challenges, and Solutions", IEEE communications Surveys & Tutorials, vol. 17, Issue: 4, IEEE, Jun. 2015, pp. 2377-2396. (Year: 2015).

Notice of Allowance received for U.S. Appl. No. 16/372,887 dated Sep. 16, 2020, 32 pages.

* cited by examiner

US 10,972,958 B1

LOCATION-BASED ROUTE MANAGEMENT FOR VEHICLE-TO-EVERYTHING RELAY COMMUNICATIONS

TECHNICAL FIELD

The subject application is related to wireless communication systems, and, for example, to vehicle-to-everything (V2X) communications, using location-controlled data propagation, such as in a New Radio (NR) wireless network.

BACKGROUND

In LTE wireless communication systems, vehicle-to-everything (V2X) generally utilizes the Sidelink interface, alternatively referred to as PC5, to enable V2X communications, including V2V (vehicle-to-vehicle) communications, V2I (vehicle-to-infrastructure) communications, V2P (vehicle-to-pedestrian) communications and V2N (vehicle-to-network) communications. The PC5 interface is built based on a mesh architecture of peer-to-peer device communication. LTE V2X also supports Uu interface (the radio interface between the mobile device and the radio access network) enhancement to assist the PC5 communications.

NR V2X is being designed to support enhanced V2X use cases such as vehicle platooning that enables the vehicles traveling together to dynamically form a platoon. NR V2X is also being designed to support extended sensors that enable the exchange of raw or processed data gathered through local sensors or live video images among vehicles, road side units, devices of pedestrian and V2X application servers. Further, NR V2X is being designed to support advanced driving that enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intension with vehicles in proximity too.

Existing (e.g., PC5-based) interfaces assume a mesh architecture in which every node is a peer to each other. This approach does not rely on any network infrastructure. However, spectrum efficiency cannot be very high because of the peer-to-peer structure. Another drawback of this mesh architecture is that it is not compatible with infrastructure-based cellular networks that utilize a hierarchical architecture. As a result, a separate spectrum needs to be obtained to deploy a V2X service based on a peer-to-peer mesh network architecture, which is very costly.

A wireless communication system, such as, for example, a three-party communication framework for V2X can be implemented, in which the three-party communication framework imposes a hierarchical structure in the peer-to-peer network. In the three-party communication framework, a given node—typically a node other than the transmitter and the receiver—is designated to coordinate the radio resource usage. This chosen node, (which can be chosen by the network or elected by other, managed nodes) can be referred to as a "local manager" or a "scheduler node" (Node-S), and is responsible for the scheduling and resource allocation among the nodes it manages, e.g., a transmitting node (Node-T), and one or more receiving node(s) (Node-R(s)). Such a three-party communication framework is beneficial in advanced use cases such as vehicle platooning, whereas a designated leader node is responsible for leading and managing the platoon.

The three-party communication might not however be sufficient to enable highly reliable communication between nodes that form a V2X connection, due for example to blockage, especially in mm-Wave frequencies, or due to an edge effect, where the transmitting node is too far from a node-S or a Node-R to reliably transmit the data.

A chain rebroadcast solution is able enhance the reliability of such sidelink communications by letting receiver user equipments rebroadcast a received message, which achieves a chain effect. While this solution effectively improves reliability, significant and unnecessary transmission and interference can result in the network, generally because the rebroadcast is "blind" in the sense that there is no route management. However, traditional route management is difficult to apply in a full mesh-based mobile environment, because any routing table would need to be relatively large and require frequent updating, and because it is difficult to guarantee a synchronized routing table with a mesh-like structure.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
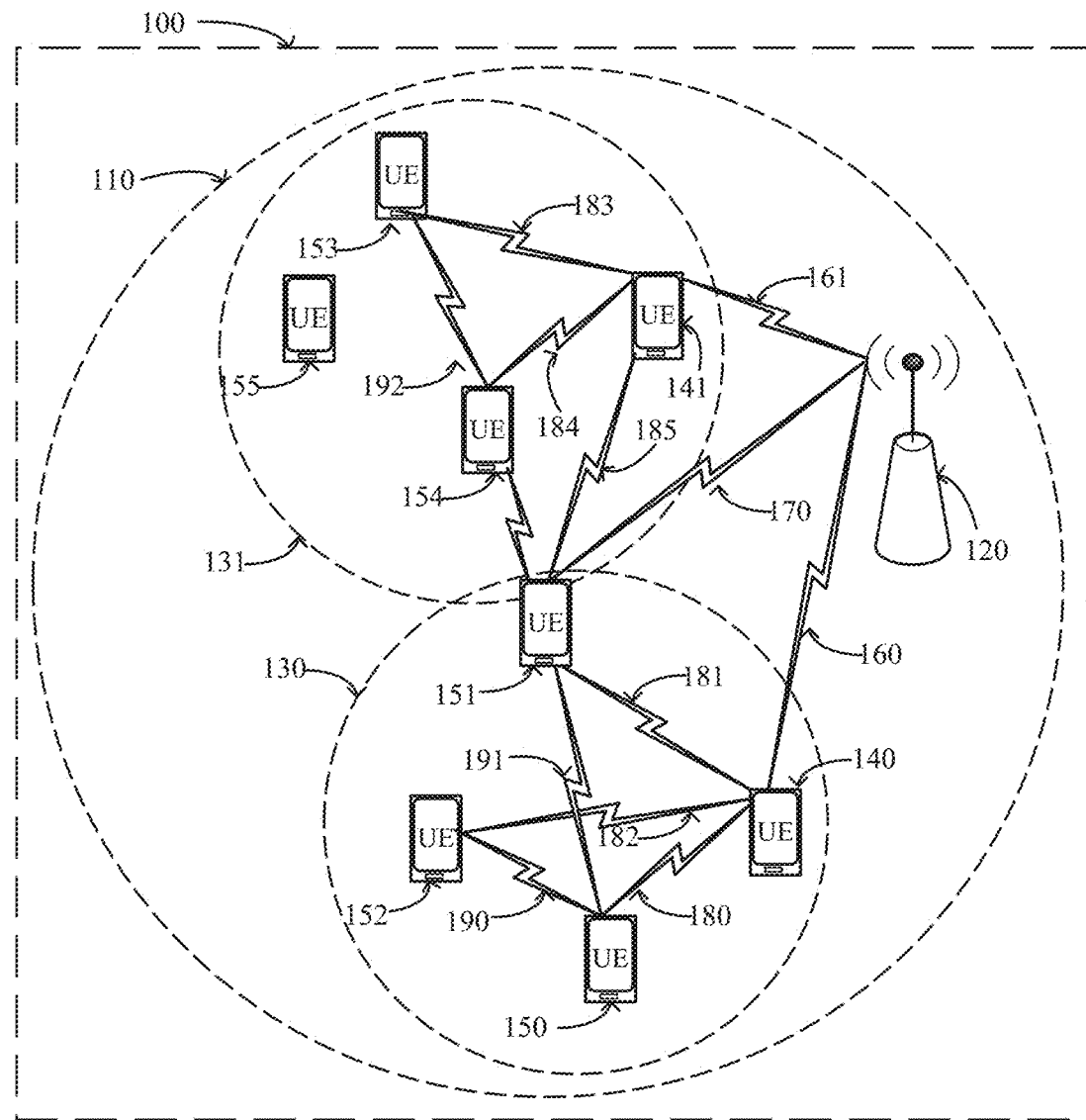
FIG. 1 illustrates an example wireless three-party communication system including scheduling nodes, transmitting nodes and receiving nodes that can communicate via side-link transmissions, in accordance with various aspects and embodiments of the subject disclosure.

Various aspects of the technology described herein are directed towards increasing the reliability of transmitting information, as well as extending the coverage of a V2X network in one or more implementations, in a location-controlled manner. To this end, the technology described herein facilitates forming a macro-diversity transmitting scheme based on location information that controls the relaying of information across multiple nodes. One or more aspects of the technology described herein comprise a framework for extending the coverage and reliability of V2X broadcast/group-cast signals, including by having nodes in the network that are positioned at relative locations propagate received information in a multiple-stage (two or more stage) chain communication. Other nodes that receive the V2X broadcast/group-cast signals, but are not positioned at the appropriate locations, do not participate in the retransmission.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "user equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

As exemplified in FIG. 1, a wireless cellular communications system 100 is depicted. A base station 120 provides coverage in geographic area 110 comprising the cell. Air interfaces 160, 161, 170 provide downlink and uplink communication links for UEs 140, 141, 150, respectively. Note that all UEs 140, 141, 150, 151, 152, 153, 154, 155 can be assumed to have uplink/downlink communication links with base station 120, although this is not expressly depicted in FIG. 1 for purposes of readability.

Air interfaces 180, 181, 182, 183, 184, 185, 190, 191, 192 can provide sidelink connectivity between two given UEs. A local manager, referred to herein as Node-S, can locally control transmissions on the sidelink within an area (or other grouping) associated with the Node-S. In the example of FIG. 1, a Node-S 140 controls sidelink transmissions in area 101, and a Node-S 141 controls sidelink transmissions in area 131. In general, a Node-S, such as the Node-S 140, sends common downlink control information (DCI) to a transmitting node (Node-T, such as the node 150) and the receiving node(s), i.e., one or more Node-R(s), such as the node 152. Transmission and reception thus occurs on the sidelink between a plurality of UEs.

Note that in some implementations, the Node-T can implicitly or explicitly acknowledge reception of the downlink control information; (note that in contemporary cellular communications systems, downlink control information is not acknowledged). Also, in contrast to contemporary cellular communications systems, the downlink control information and associated data can be transmitted from two different nodes. More particularly, the downlink control information is transmitted by the Node-S 140, whereas data is transmitted by the Node-T 150. Unicast, multicast and broadcast schemes can be implemented.

In one embodiment, a common downlink control information is sent to the transmitting (Node-T) and receiving (Node-R) nodes. For example, the Node-S 140 may send downlink control information to the nodes 150, 151, 152 via the sidelinks 180, 181, 182, whereby Node-T 150 subsequently sends data to nodes 151 and 152 via the sidelinks 190, 191. The nodes 151 and 152 in this example are each referred to as a Node-R, because the Node-T 150 in this example transmits to a plurality of Node-Rs; this scenario is called the broadcast or multicast scenario. In another example, the Node-S 141 may send downlink control information to the nodes 153, 154 via sidelinks 183,184 whereby the Node-T 153 subsequently sends data to the Node-R 154 via sidelink 192, e.g., in a unicast transmission.

Note that in this example, the local manager nodes 140, 141, namely the Node-S 140 and the Node-s 141 in the system 100 are configured to be local managers by the base station 120 via links 160, 161, whereby any node can transmit or receive via a sidelink controlled by at least one Node-S. Hence, whether a node is transmitting (in the Node-T state) or receiving (in the Node-R state) is dynamically controlled by a Node-S, based on the downlink control information. Note that it is feasible for a Node-S to be elected as a local (group) manager by a group of user equipment nodes without a base station configuration, at least temporarily.

Figure 2:
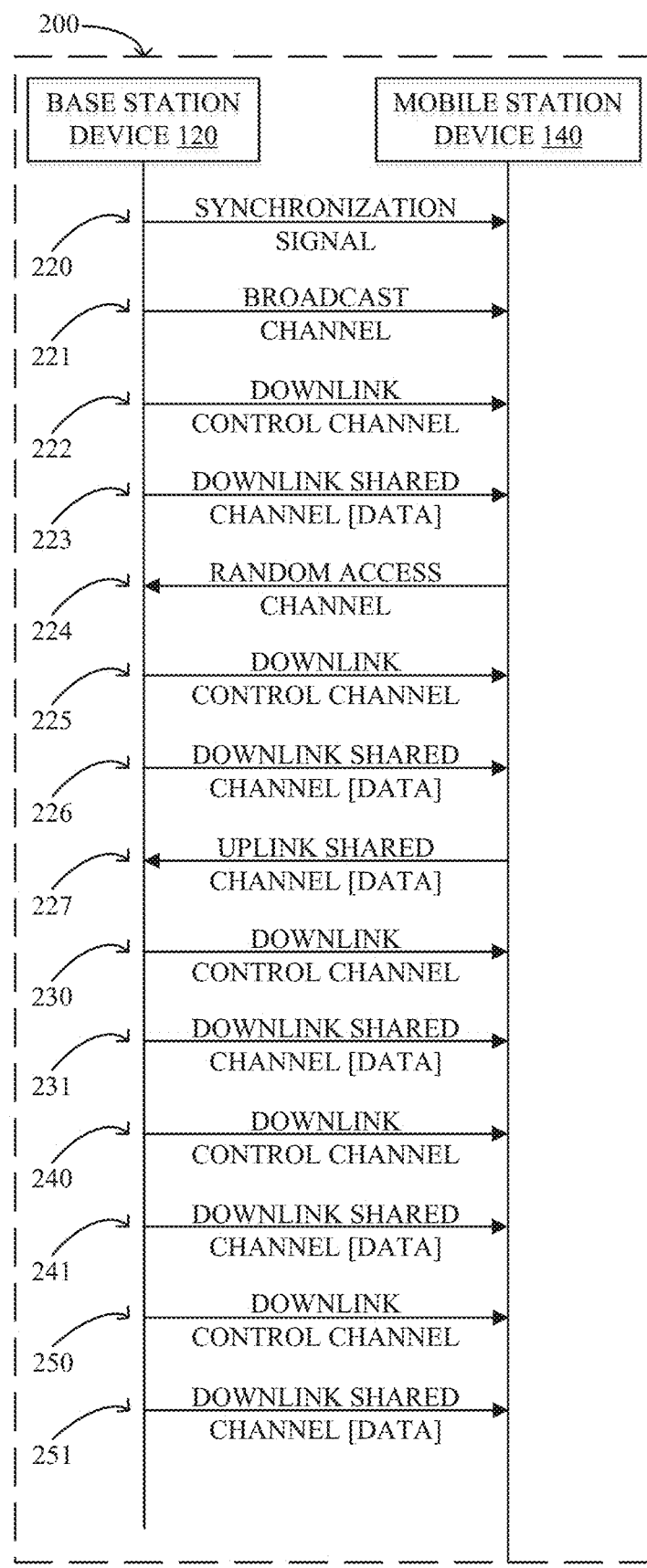
FIG. 2 illustrates an example timing diagram showing communications between a base station and a mobile station device, such as a local manager device, in accordance with various aspects and embodiments of the subject disclosure.

Now referring to FIG. 2, a UE 140 may receive a synchronization signal 220 from a base station 120. The synchronization signal allows the UE 140 to become time and frequency synchronized with base station 120 such that UE 140 can receive waveforms carrying information from base station 120. The synchronization signal may also convey information needed to receive the broadcast channel in 221. Amongst other data, information carried on the broadcast channel configures the UE to receive a downlink control channel 222 for scheduling a downlink shared channel 223. Data transmitted via the downlink shared channel configures the UE to initiate a random access procedure by transmitting a random access channel in 224. The base station schedules a random access response by means of a downlink control channel 225 carried on another downlink shared channel 226. The random access response contains a scheduling assignment and a timing advance for the UE to transmit the first uplink shared channel transmission in 227. The uplink shared channel conveys a user ID. In case of contention resolution during the random access procedure, base station 120 schedules another downlink control channel 230 scheduling a downlink shared channel 231 to resolve contention. Yet another downlink control channel 240 schedules a downlink shared channel 241 to initiate configuration of UE 140 for communication with base station 120. Once UE 140 is fully configured for bi-directional and secure communication with base station 120 via air interface 160, base station 120 sends yet another downlink control channel 250 scheduling a downlink shared channel 251 to initiate configuration of UE 140 as a Node-S.

In one or more implementations, the base station 120 configures each Node-S 140, 141 with orthogonal resource pools. Resources are defined in the time and frequency domain. For example, in a wireless communications system employing orthogonal frequency-division multiple access (OFDMA) different Node-S may be assigned different subcarrier indices (frequency domain) and OFDM symbols (time domain) for data transmission. Similarly, the same or different subcarrier indices and OFDM symbols may be configured for control channel transmissions. For control channel transmissions, however, identical time/frequency resources can be configured for multiple Node-Ss, whereby each Node-S is assigned a different search space for control channel transmissions within the identical time/frequency resources. Additional resources may be configured by base station 120 for each Node-S 140, 141, e.g., for physical random access channel (PRACH) and physical uplink control channel (PUCCH) transmissions. These may be used by a Node-S to send scheduling requests or other uplink control information (UCI) such as channel state information (CSI) feedback or HARQ acknowledgements.

Similarly, the base station 120 configures UEs 150, 151, 152, 153, 154, 155 for communication via sidelinks. Unlike Node-S UEs, which are configured by base station 120 as a Node-S via dedicated signaling (e.g. to configure the orthogonal resource pools and search spaces), UEs that transmit and receive via a sidelink but are not configured as a local manager/Node-S—that is, these nodes are controlled by a Node-S rather than being configured as one—can be configured for sidelink communication under the control of a local manager via common signaling. In particular, a given node that is not a Node-S is aware of the resource pools of the Node-S within cell 110. In one embodiment, these nodes are configured by common broadcast signaling from the base station 120, however, configuration by dedicated messages is not precluded. For example, sidelink information including the resource pools of all Node-S in 110 can be included as part of the radio resource control (RRC) setup or reconfiguration of a node 150, 151, 152, 153, 154, 155. Because a given node that is not a Node-S is aware of the resource pools of the one or more Node-S in 110, such a node can receive downlink control information from one or more Node-S in its proximity. This is illustrated in FIG. 1 for UE 151, which can receive from a first Node-S 140 via a first sidelink 181 and from a second Node-S 141 via a second sidelink 185, respectively.

As mentioned herein, the nodes 150, 151, 152, 153, 154, 155 are configured to receive from the Node-S 140, 141 by base station 120. Hence, when monitoring for downlink control information, a given node 150, 151, 152, 153, 154, 155 potentially can receive downlink control information from multiple Node-Ss. This allows for a seamless transition between a local area 130 controlled by a first local manager Node-S 140 and a local area 131 controlled by a second local manager Node-S 141. In particular, such a transition does not require a handover or any other signaling from base station 120.

Data transmission is facilitated via the sidelinks in a wireless communications system 100, whereby the communication via the sidelink is controlled by local traffic managers Node-S 140, 141. Note that in traditional state-of-the-art communications systems, control channel and data channel transmissions are transmitted and received by the same pair of nodes. For example, in FIG. 2, both downlink shared channel and uplink shared channel transmissions are scheduled by base station 120, whereby for the downlink base station 120 is the transmitter and UE 140 is the receiver, and whereby for the uplink, UE 140 is the transmitter and base station 120 is the receiver. Even for the state-of-the-art sidelink, e.g., in the device-to-device (D2D) feature of the Long-Term Evolution (LTE) standard defined by the Third Generation Partnership Project (3GPPP), the control and data transmissions occur between two UEs. In the embodiments described herein, and unlike prior art that exclusively deals with pairs of nodes, a three-party communication sidelink design can be provided. The HARQ and scheduling procedures of a three-party communication sidelink design are described herein; however it should be understood that the technology described herein is not limited to a three-party communication system as used in the examples, but can provide benefits with and is intended to work in any wireless communication system.

Unlike traditional D2D or vehicle-to-vehicle (V2V) communications systems, which deal with pairs of nodes, in which for a given node the sidelink control channel and the sidelink data channel transmissions occur between the same pair of nodes, in one or more embodiments described herein, downlink control information is transmitted by a Node-S and data is transmitted by a Node-T and received by a Node-R. Generally, Node-S, Node-T, and Node-R are three distinct nodes, however, a scenario in which a Node-S also acts as a transmitter Node-T are not precluded. Furthermore, as discussed herein, whether a node acts as transmitter (Node-T) or receiver (node-R) is generally controlled by the Node-S, depending on whether the downlink control information sent by Node-S and received by a given node instructs the receiving node to transmit (in which case it acts as Node-T) or to receive (in which case it acts as Node-R).

Figure 3:
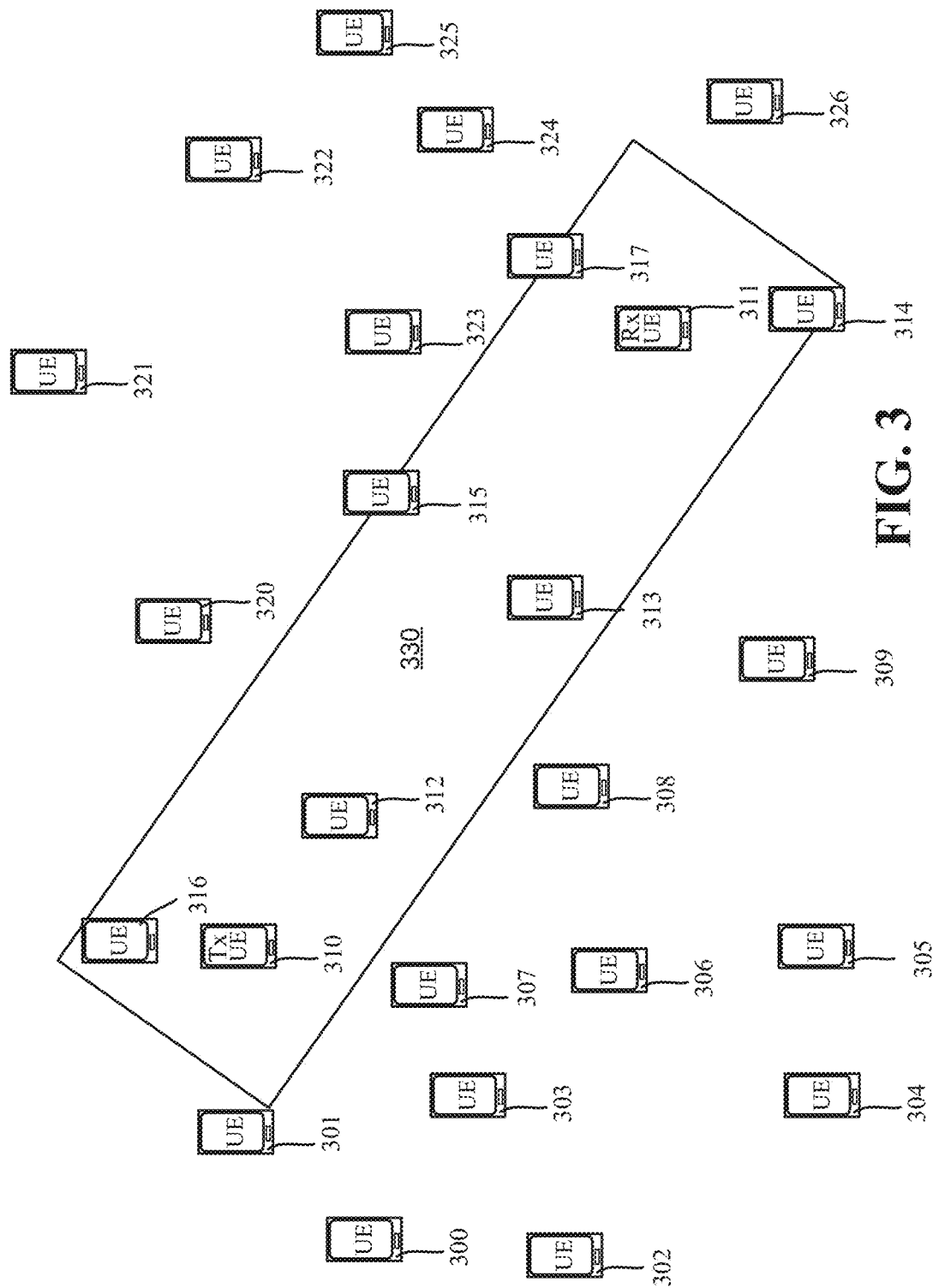
FIG. 3 is an example representation of how a communication can be rebroadcast to propagate information based on a location controlled, route managed multiple-stage chain communication path, in accordance with various aspects and embodiments of the subject disclosure.

FIG. 3 shows an example of how a broadcast communication message from one node is propagated based on location-controlled distributed route management by rebroadcasting the communication message to other nodes, such as other nodes of a three party communication system. Note that the communication message can comprise any information, such as control channel data, or data channel data. Further note that the example of FIG. 3 as described herein refers to a broadcast data packet and rebroadcasting of that data packet, however it is understood that the technology also applies to group-cast data packets, and/or any communication message in general that can be retransmitted.

In the example of FIG. 3, a number of nodes (user equipments, or UEs) 300-317 and 320-326 are shown, such as managed by a local manager, such as the UE 315. In FIG. 3, consider that the node 310 is a transmitter node, and that the node 311 is the receiver node. As scheduled, the transmitter node 310 sends a broadcast data packet (communications message) intended for the receiver node 311, which as described herein, may need to receive the data packet rebroadcasted from another node. The transmitter UE 310 broadcasts or group-casts the data packet in conjunction with the coordinates of transmitter UE 310 and receiver UE 311. The coordinates can be included as part of an associated control channel or appended or otherwise "piggybacked" to the data packet. Note that the coordinates of the intermediate node(s) within the communication path may not be known at the transmitter UE 311.

Instead of having each other node that receives the packet rebroadcast the data packet, which can lead to significant and unnecessary transmission and interference, only certain nodes rebroadcast the data packet, based on their relative location data. More particularly, a communication path 330 is established according to the known coordinates of the transmitter UE 310 and the receiver UE 311. The communication path 330 can be defined as an area covering transmitter UE 310 and the receiver UE 311 and the line-of-sight line between them. Note that in FIG. 3 a rectangular area is shown as representing the communication path 330, however any suitable polygon (or polyhedron if considering altitude) can be used, as well as a circle or oval, for example, and possibly even an irregular area.

Any UE that receives the broadcast data packet compare the communication path with its own coordinates to determine whether it is within the communication path 330. In the example of FIG. 3, it is seen that the UEs 312-317 are within the communication path 330, and as such, are candidates for rebroadcasting the data packet. The UEs 301-309 and 320-326 are not in the communication path, and thus do not rebroadcast the data packet in this example. Note that as shown in FIG. 3, the area can be somewhat larger than the area ranging from the transmitter UE 310 to the receiver UE 311; for example, the UE 316 is slightly behind the transmitter UE 310 and the UE 314 is slightly beyond the receiver UE 311, yet both are still considered to be within the rebroadcasting area 330.

Although FIG. 3 shows a fixed area, the shape of communication path for any given UE can depend on certain other information regarding that UE. For example, a receiving UE can use a "fuzzy" logic or other mechanism that, for example can be based on a series of high layer configured policy, to calculate the communication path according to the coordinates of transmitter and receiver. The logic can consider some or all of the following as factors, which are non-limiting:

the battery state; e.g. UEs with a larger remaining battery capacity may consider a larger/wider coordination path, the UE's own traffic, e.g., if UE has its own data packet(s) to transmit, the UE may consider the communication path as zero or automatically outside the path (and thus opt itself out from re-broadcast/group-cast), and/or the traffic type of the data packet; e.g. higher reliability data traffic may have larger/wider coordination path.

Figure 4:
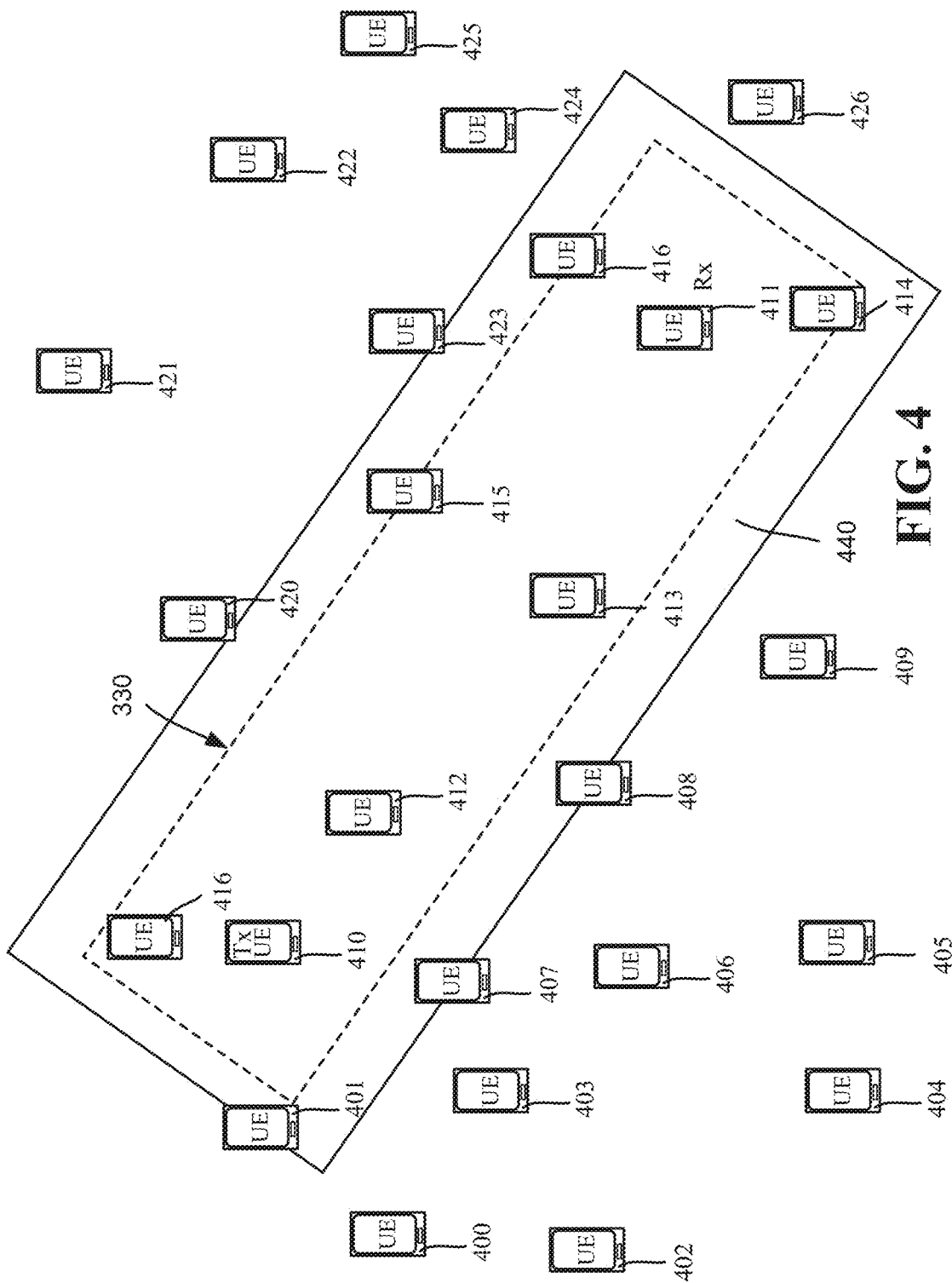
FIG. 4 is an example representation of how a communication can be rebroadcast to propagate information based on a location controlled, route managed multiple-stage chain communication path (reshaped relative to FIG. 3), in accordance with various aspects and embodiments of the subject disclosure.

FIG. 4 shows the concept of enlarging the communications path to an enlarged communication path 440 area; (the dashed box 330 shows the communications path 330 area of FIG. 3 for comparison). For example, consider that the traffic type of the data packet transmitted from the transmitter UE 410 (in conjunction with the transmitter UE 410's and receiver UE 411's respective coordinates) indicates that high-reliability is desired, and thus each UEs that receives the data packet enlarges the area (relative to a regular reliability packet) when evaluating whether that UE is in the communication path 440 area and can rebroadcast.

Thus, in the example of FIG. 4, it is seen that the UEs 401, 407, 408, 420 and 423 are within the enlarged communication path 440 area, and thus can rebroadcast the data packet. Note that as described herein, other factors may preclude the rebroadcast.

Figure 5:
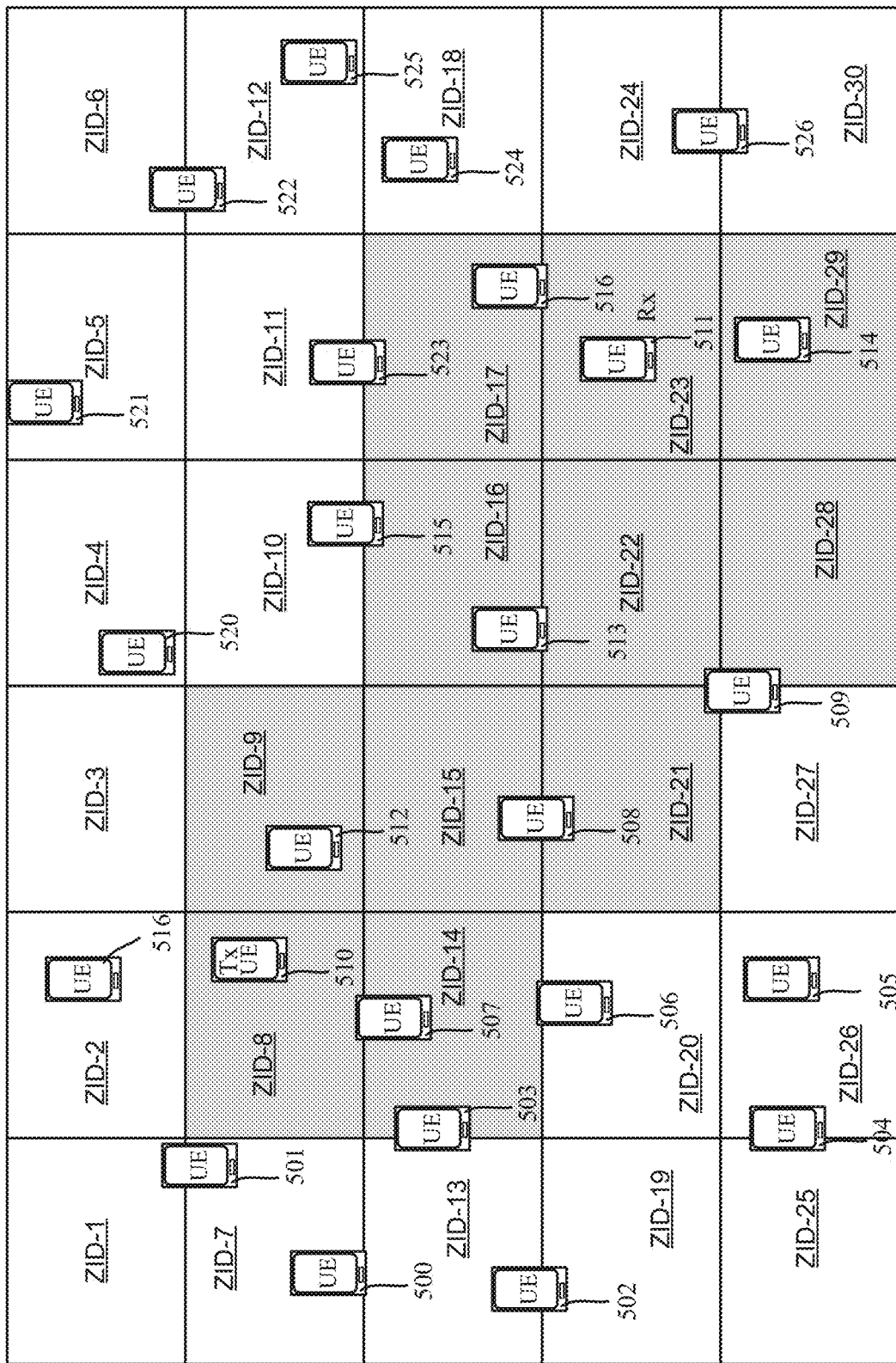
FIG. 5 is an example representation of how a communication can be rebroadcast to propagate information based on a location controlled, route managed multiple-stage chain communication path using quantized coordinates (e.g., zones), in accordance with various aspects and embodiments of the subject disclosure.

Turning to another aspect, FIG. 5 shows the concept of quantized coordinates, such as zone-identifiers, in contrast to the absolute coordinate examples of FIGS. 3 and 4. In example of FIG. 5, consider that some region is divided into thirty zones with zone identifiers ZID-1-ZID-30, shown as rectangles in this example; (the shaded zones are those in the communication path). The transmitting UE 510 determines its zone (ZID-8), determines the zone (ZID-23) of the receiver UE 511, and transmits this information with the data packet. In one alternative, the transmitting UE 510 can determine the relevant zones of the communication path ZID-8, ZID-9, ZID-14, ZID-15, ZID-16, ZID-17, ZID-21, ZID-22, ZID-23, ZID-28 and ZID-29 and send this as a list or the like with the data packet. Alternatively, each UE that receives the transmitting UE 510 zone ZID-8 and the receiver UE zone ZID-23 can determine the relevant other zones. Although not explicitly shown, it is understood that the relevant set of zones can be enlarged due to different circumstances, such as for highly reliable data traffic.

In any event, each UE that receives the data packet can determines whether the UE is an intermediate node in one of the zones of the communication path and thus can potentially rebroadcast the data packet. As can be seen, whether based on absolute coordinates as in FIGS. 3 and 4, or quantized coordinates as in FIG. 5, only a limited number of intermediate nodes are eligible to participate in the rebroadcasting, thereby reducing overall traffic and interference.

Figure 6:
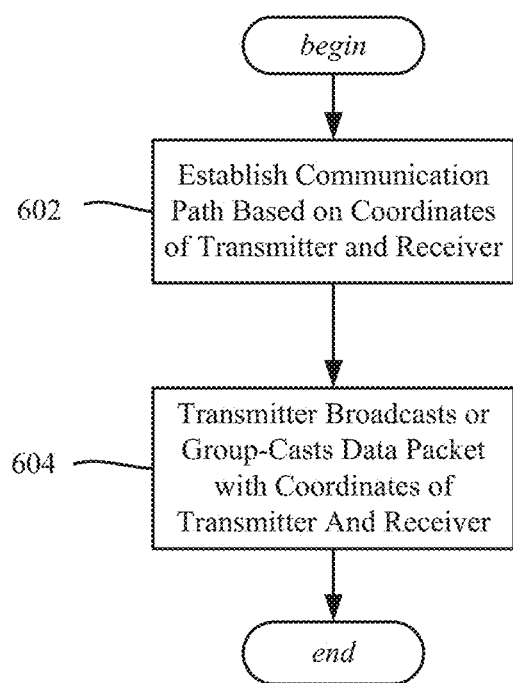
FIG. 6 is flow diagram representing example operations related to transmitting a data packet in conjunction with transmitter location data and receiver location data, in accordance with various aspects and embodiments of the subject disclosure.

FIG. 6 shows example operations of a transmitter node, beginning at operation 602 where a communication path is established according to the coordinates of the transmitter and receiver nodes. At operation 604, the transmitter broadcasts or group-casts the data packet in conjunction with the coordinates of transmitter and receiver. As described above, these can be absolute coordinates or quantized coordinates. As also set forth above, if quantized coordinates, the transmitter can broadcast a list of zones or the like that are in the communication path, or the intermediate nodes can determine these other intermediate zones on their own.

Figure 7:
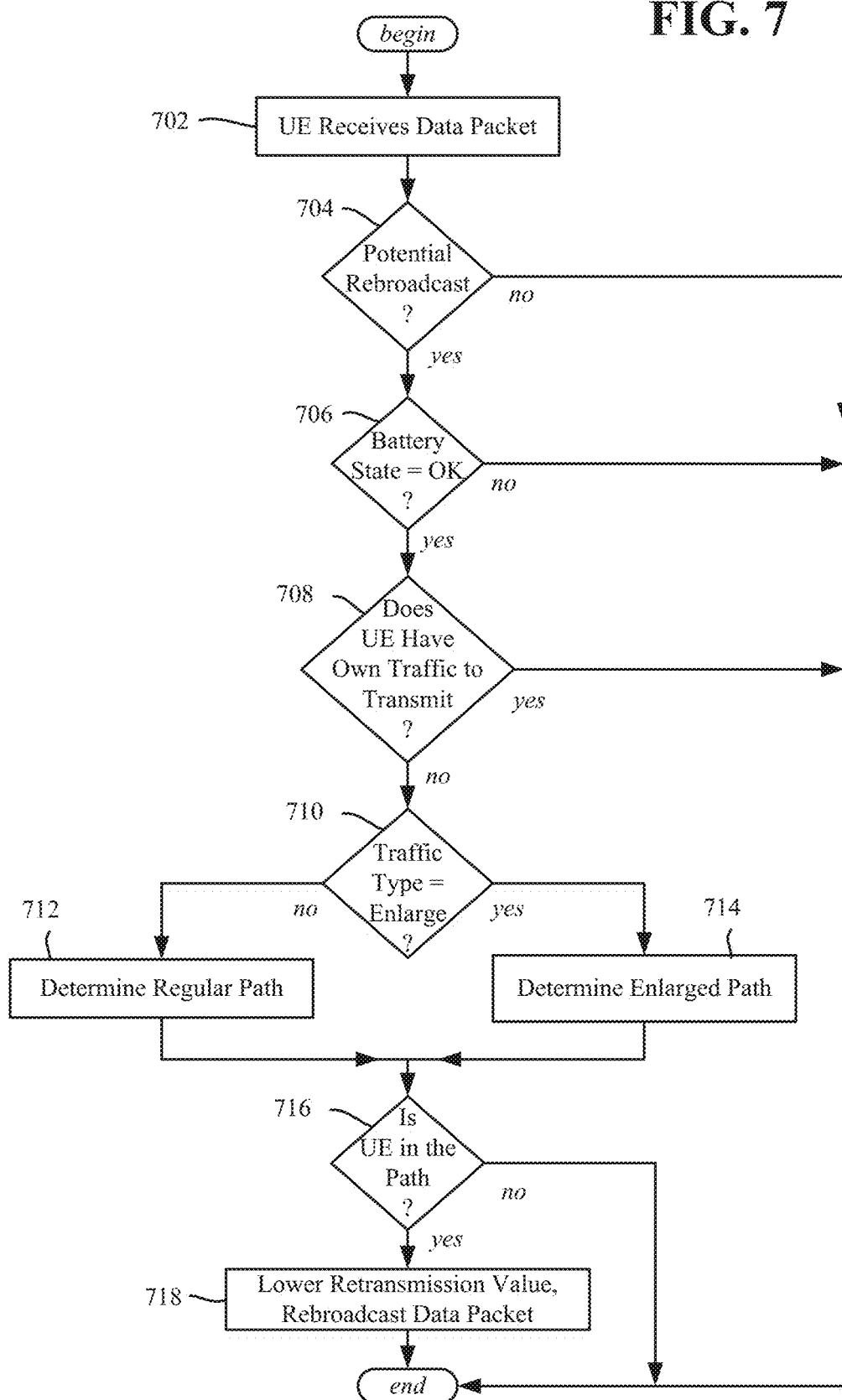
FIG. 7 represents example operations with respect to receiving a packet for potential rebroadcasting, including based on being within a location-based communication path or not, in accordance with various aspects and embodiments of the subject disclosure.

FIG. 7 shows example operations of an intermediate node such as a user equipment (UE) that receives the data packet at operation 702. Operation 704 evaluates the data packet, including for retransmission information. More particularly, a data packet that is intended for retransmission is accompanied with a retransmission value that limits how many repetition levels of retransmission are desired (to prevent potentially endless retransmissions). Any time a node receives such a data packet, the node evaluates this number to determine whether to retransmit, or whether the repetition level is reached. By way of example, consider that the retransmission value is initially two (which needs to be at or below a maximum value). When an intermediate node receives the packet, the intermediate node decrements the retransmission value to one before retransmission. A next retransmission (by a node that receives the data packet with the retransmission value of one) decrements the value to zero, which when received means that the data packet in this state is not to be further retransmitted. Note that other retransmission limiting systems can be used, but decrementing from an initial level is straightforward.

In any event, if the data packet is potentially to be retransmitted, operation 706 is performed, which represents the UE evaluating the battery state of the intermediate node. In one alternative, shown in the example of FIG. 7, the battery state is either sufficient to rebroadcast ("OK"), or is too low. In another alternative, the battery state can be used as a factor to shape (e.g., enlarge or reduce) the communications path, e.g., ranging gradually from 1.5 times the regular area if 100 percent full down to 0.25 times the area if thirty percent full and zero if below thirty percent. It is understood that this is only a non-limiting example for purposes of explanation, and any linear or non-linear computation can be used, including one that factors in other aspects of the battery, such as age, recharges and so on.

Operation 708 evaluates whether the UE has its own traffic to transmit. If so, the UE can opt out of the retransmission. Note that rather than a binary yes or no decision, other variables can be considered at operation 708, such as whether the traffic to be potentially relayed is highly reliable, how much traffic the UE has of its own (if relatively a lot, then do not relay, if only a little traffic, then relay), and so on.

If at this point the data packet is still eligible for retransmission, operation 710 represents determining whether to enlarge the communications path or not, such as based on whether the traffic is highly-reliable (FIG. 4) or not (e.g., FIG. 3). As described above, in some implementations other factors (e.g., battery state, how much of its own traffic is pending and so on) can determine the shaping of the communications path.

It should be noted that the operations of FIG. 7 can be reordered, such as for efficiency. For example, if it is significantly more efficient to first evaluate whether the UE has its own traffic to transmit (and if so, opt out) than to evaluate the retransmission value in the data packet, then operation 708 can be performed before operation 704.

In the example of FIG. 7, consider that the traffic type is the factor as to whether or not to enlarge the communication path; if not to be enlarged, operation 712 determines the regular communication path (e.g., area), otherwise operation 714 determines the enlarged communication path.

Operation 716 represents evaluating whether the UE is in the communications path area (as determined at either operation 712 or operation 714). If so, operation 718 is performed to decrement the retransmission value and rebroadcast the data packet.

In this way, if the total retransmission number for a rebroadcast/group-cast communication is not reached, and the other rebroadcast/group-cast policy is satisfied, the UE rebroadcasts/group-casts the same data packet (other than the modified retransmission value) in a predetermined resource (frequency and time) in an orchestrated manner. The predetermined radio resource can be indicated by the transmitter mobile device in the control channel or in conjunction with the data packet as received by an intermediate device. Multiple intermediate mobile devices can thus use the same radio resource for retransmission.

In one or more implementations of the re-broadcast based UE relaying, the beam management procedure at the transmitting and receiving nodes can be simplified, such that only the beams that cover the communication paths can be included in the Tx and Rx beam management procedure. In other words, instead of sweeping over all available Tx and Rx beams to determine the best beam pair link for the transmitter-receiver communication, only a subset of the beams can be used at the transmitter and the receiver according to the coordinates of the transmitter and the receiver. This can significantly reduce the overhead in the beam management procedure in applications such as V2X, where the beam management can be a bottleneck component of routing between the transmitter and the receiver.

Figure 8:
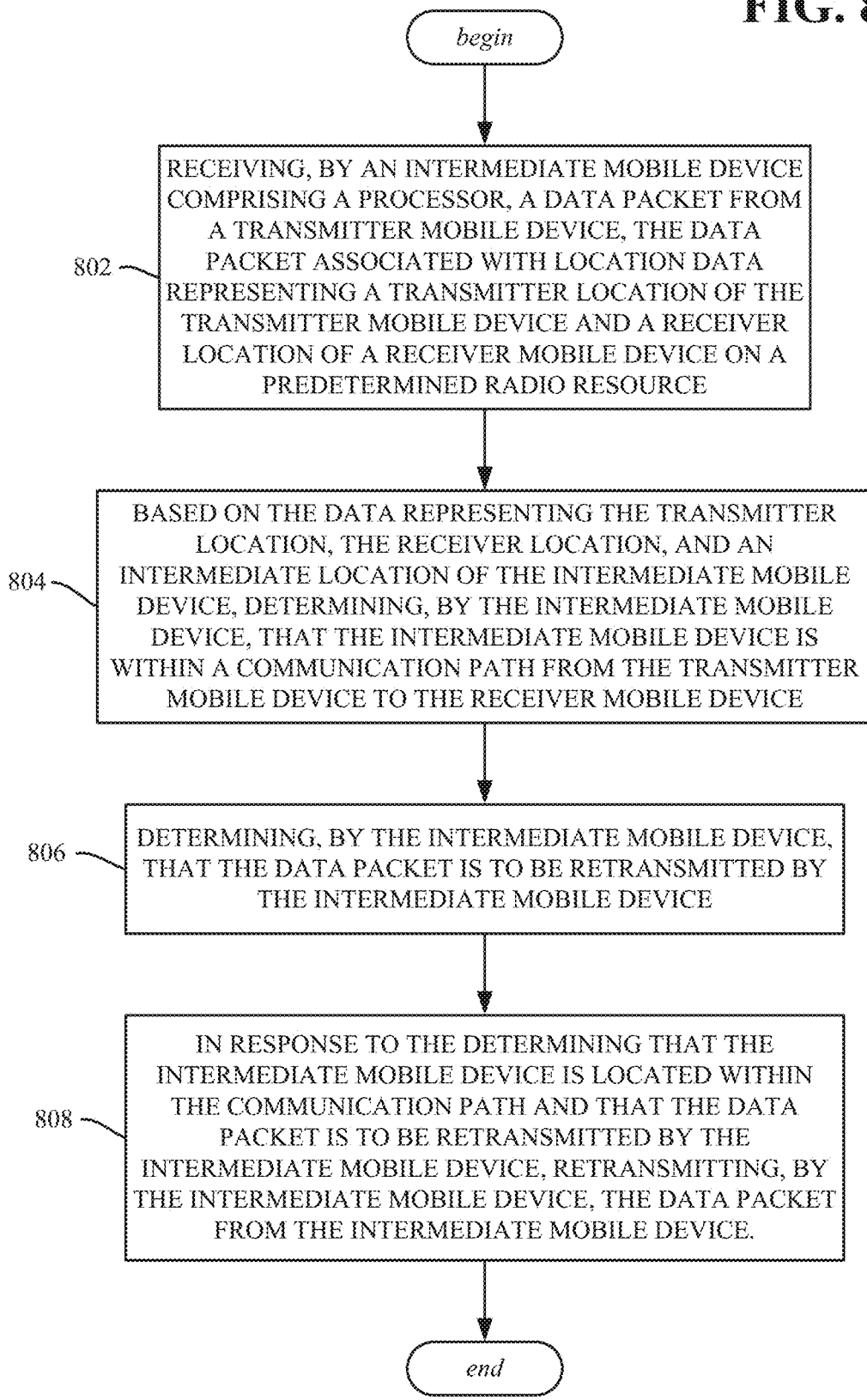
FIG. 8 illustrates example operations of an intermediate receiving mobile device that processes location data as part of retransmitting a data packet, in accordance with various aspects and embodiments of the subject disclosure.

One or more aspects, such as those implemented in example operations of a method, are shown in FIG. 8 in accordance with various aspects and embodiments of the subject disclosure. Operation 802 represents receiving, by an intermediate mobile device comprising a processor, a data packet from a transmitter mobile device, the data packet associated with location data representing a transmitter location of the transmitter mobile device and a receiver location of a receiver mobile device. Operation 804 represents based on the data representing the transmitter location, the receiver location, and an intermediate location of the intermediate mobile device, determining, by the intermediate mobile device, that the intermediate mobile device is within a communication path from the transmitter mobile device to the receiver mobile device. Operation 806 represents, determining, by the intermediate mobile device, that the data packet is to be retransmitted by the intermediate mobile device. Operation 808 represents, in response to the determining that the intermediate mobile device is located within the communication path and that the data packet is to be retransmitted by the intermediate mobile device, retransmitting, by the intermediate mobile device, the data packet from the intermediate mobile device on a predetermined radio resource.

Receiving the location data representing the transmitter location of the transmitter mobile device and the receiver location of the receiver mobile device can comprise receiving first coordinates of the transmitter mobile device and second coordinates of the receiver mobile device.

Receiving the location data representing the transmitter location of the transmitter mobile device and the receiver location of the receiver mobile device can comprise receiving area identification information.

Receiving the location data representing the transmitter location of the transmitter mobile device and the receiver location of the receiver mobile device can comprise receiving the location data in conjunction with receiving the data packet.

The predetermined radio resource can be received from the transmitter mobile device in a control channel or in conjunction with receiving the data packet; the predetermined radio resource can be indicated to be used as the radio resource for retransmission by one or more intermediate mobile devices.

Receiving the location data representing the transmitter location of the transmitter mobile device and the receiver location of the receiver mobile device can comprise receiving the location data via a control channel.

Receiving the data packet from the transmitter mobile device can comprise receiving a broadcast data packet or receiving a group-cast data packet.

Determining that the data packet is to be retransmitted by the intermediate mobile device can comprise determining that the intermediate mobile device does not have alternative data to transmit.

Determining that the data packet is to be retransmitted by the intermediate mobile device can comprise determining that a retransmission repetition value associated with the data packet indicates that retransmission of the data packet is active.

Determining that the intermediate mobile device is within a communication path from the transmitter mobile device to the receiver mobile device can comprise evaluating battery data of the intermediate mobile device.

Determining that the intermediate mobile device is within a communication path from the transmitter mobile device to the receiver mobile device can comprise evaluating a traffic type of the data packet.

Figure 9:
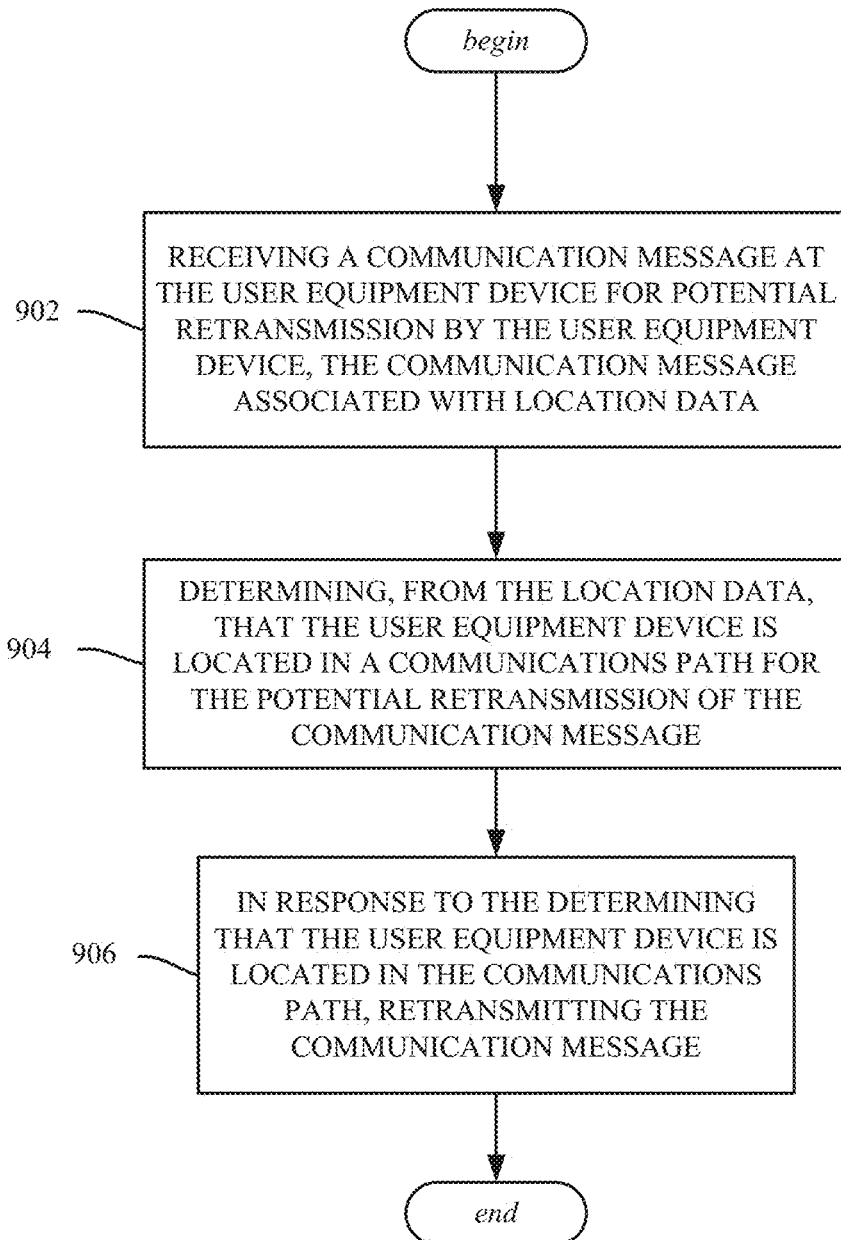
FIG. 9 illustrates example operations of a user equipment device that processes location data to determine a communication path as part of retransmitting a communications message, in accordance with various aspects and embodiments of the subject disclosure.

One or more example aspects are represented in FIG. 9, and can correspond to a system comprising a processor and a memory that stores executable instructions that, when executed by the processor of a user equipment device, facilitate performance of operations and/or executable components. Example operations comprise operation 902, which represents receiving a communication message at the user equipment device for potential retransmission by the user equipment device, the communication message associated with location data. Operation 904 represents determining, from the location data, that the user equipment device is located in a communications path for the potential retransmission of the communication message. Operation 906 represents, in response to the determining that the user equipment device is located in the communications path, retransmitting the communication message.

The location data can comprise first coordinates of a transmitter device and second coordinates of a receiver device, and determining that the user equipment device is in the communications path can comprise evaluating the first and second coordinates relative to a current location of the user equipment device.

The location data can comprise area information, and determining that the user equipment device is in the communications path can comprise determining that the user equipment device is at a current location corresponding to the area information.

Further operations can comprise shaping the communications path based on at least one of: a traffic type corresponding to the communications message, or a current battery state of the user equipment.

Further operations can comprise obtaining received repetition data in association with the communications message, determining from the received repetition data that the communication message is intended to be retransmitted at least one more time and, in conjunction with the retransmitting the communications message, modifying the repetition data into modified repetition data that indicates that the communication message is intended for retransmission one fewer time than was indicated in the received repetition data.

Further operations can comprise, based on the location data, sweeping a reduced number of available beams to select a beam pair link for the retransmitting of the communication message.

Figure 10:
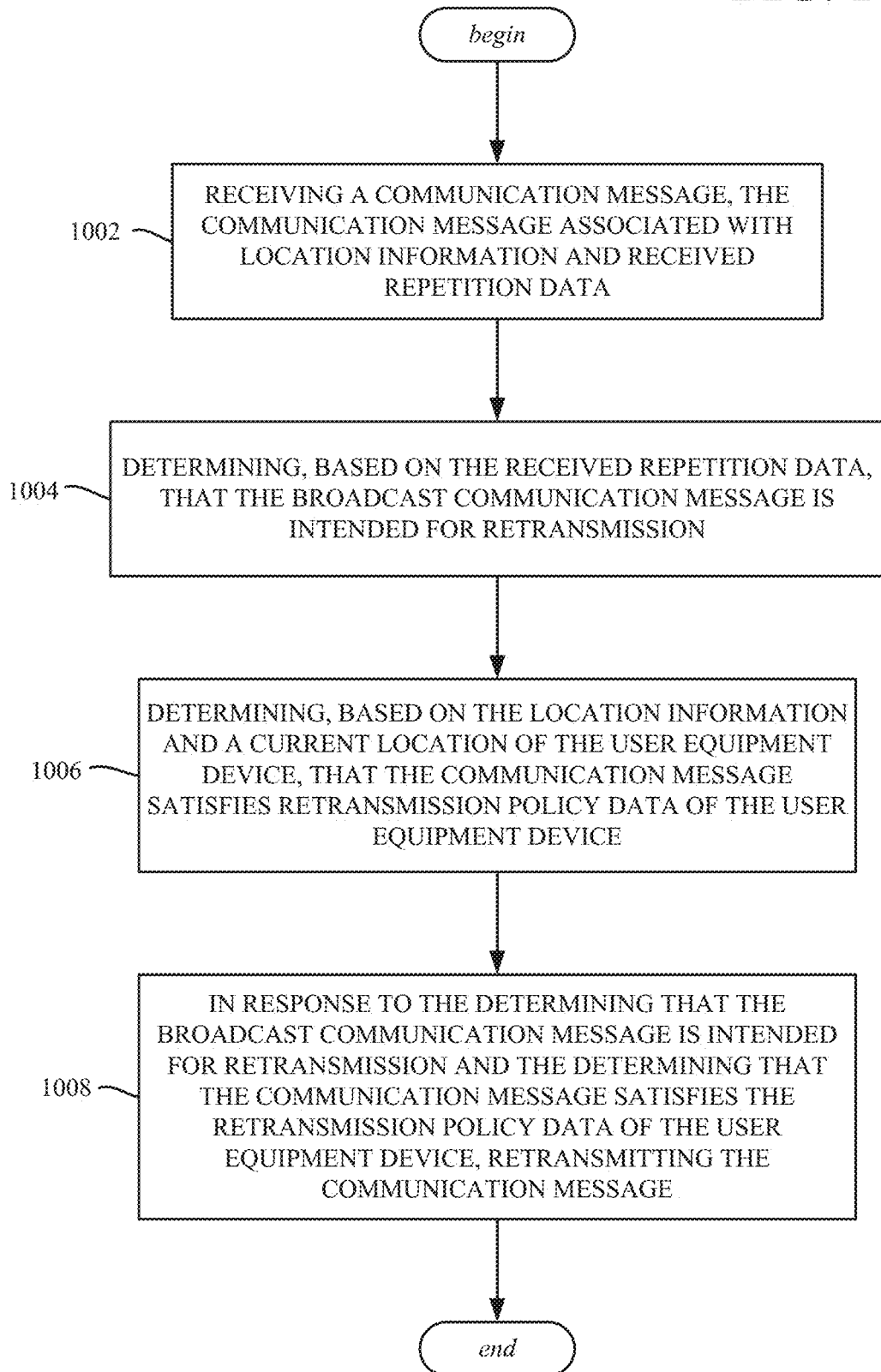
FIG. 10 illustrates example operations of a device that processes received location data and repetition data, along with retransmission policy data of the device, to retransmit a communications message, in accordance with various aspects and embodiments of the subject disclosure.

One or more aspects, such as implemented in a machine-readable storage medium, comprising executable instructions that, when executed by a processor of a network device of a wireless communication system, facilitate performance of operations, are represented in FIG. 10. Example operations comprise operation 1002, which represents receiving a communication message, the communication message associated with location information and received repetition data. Operation 1004 represents determining, based on the received repetition data, that the broadcast communication message is intended for retransmission. Operation 1006 represents determining, based on the location information and a current location of the user equipment device, that the communication message satisfies retransmission policy data of the user equipment device. Operation 1008 represents, in response to the determining that the broadcast communication message is intended for retransmission and the determining that the communication message satisfies the retransmission policy data of the user equipment device, retransmitting the communication message.

Determining that the communication message satisfies the retransmission policy data of the user equipment device can comprise determining, based on the location information and the current location of the user equipment device that the user equipment device is within a communications path. Further operations can comprise shaping the communications path based on at least one of: traffic type of the communication message, battery state of the user equipment device, or information related to pending data packet transmission of the user equipment device. The location information can correspond to a transmitter device location and a receiver device location, and determining that the communication message satisfies the retransmission policy data of the user equipment device can comprise determining based on the location information and the current location of the user equipment device that the user equipment device is within an area covering the transmitter device and the receiver device.

As can be seen, the technology described herein provides for distributed route management for the New Radio sidelink rebroadcast/group-cast, which is based on received location information. The framework facilitates increased reliability and coverage in a V2X network with a directional controlled route management. Advantages include that route management is achieved in a distributed manner, where the input comprises the coordinates of transmitter and receiver. The route management improves the efficiency of rebroadcast/group-cast, in that intermediate nodes such as UEs determine whether to participate in a rebroadcast/group-cast according to each node's configured policy (e.g., considering battery status and traffic type). The network can tune the policy to adjust the trade-off between the number of rebroadcast/group-cast transmissions and the reliability of the data transmissions.

Figure 11:
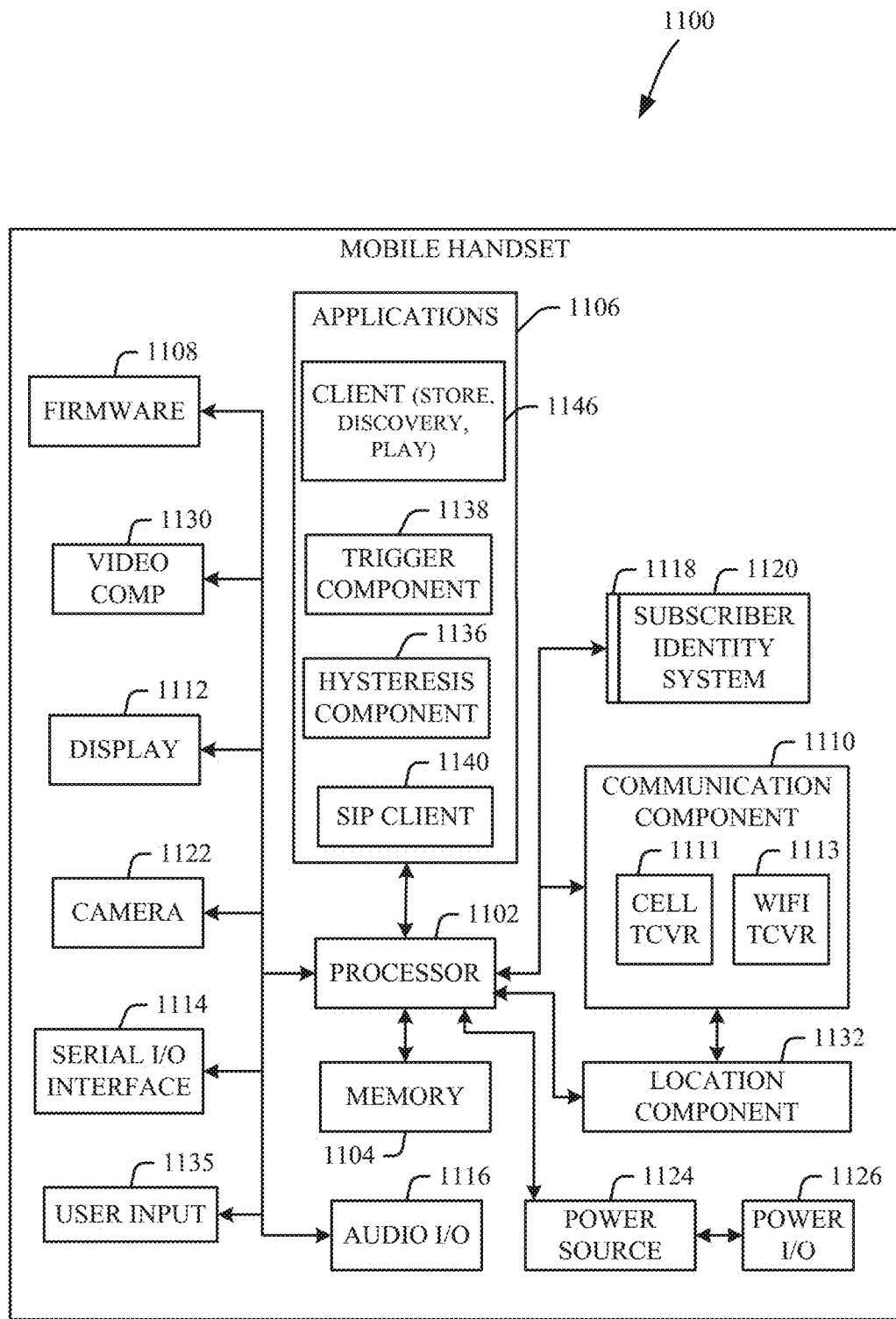
FIG. 11 illustrates an example block diagram of an example user equipment that can be a mobile handset, in accordance with various aspects and embodiments of the subject disclosure.

Referring now to FIG. 11, illustrated is a schematic block diagram of an example end-user device such as a user equipment) that can be a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
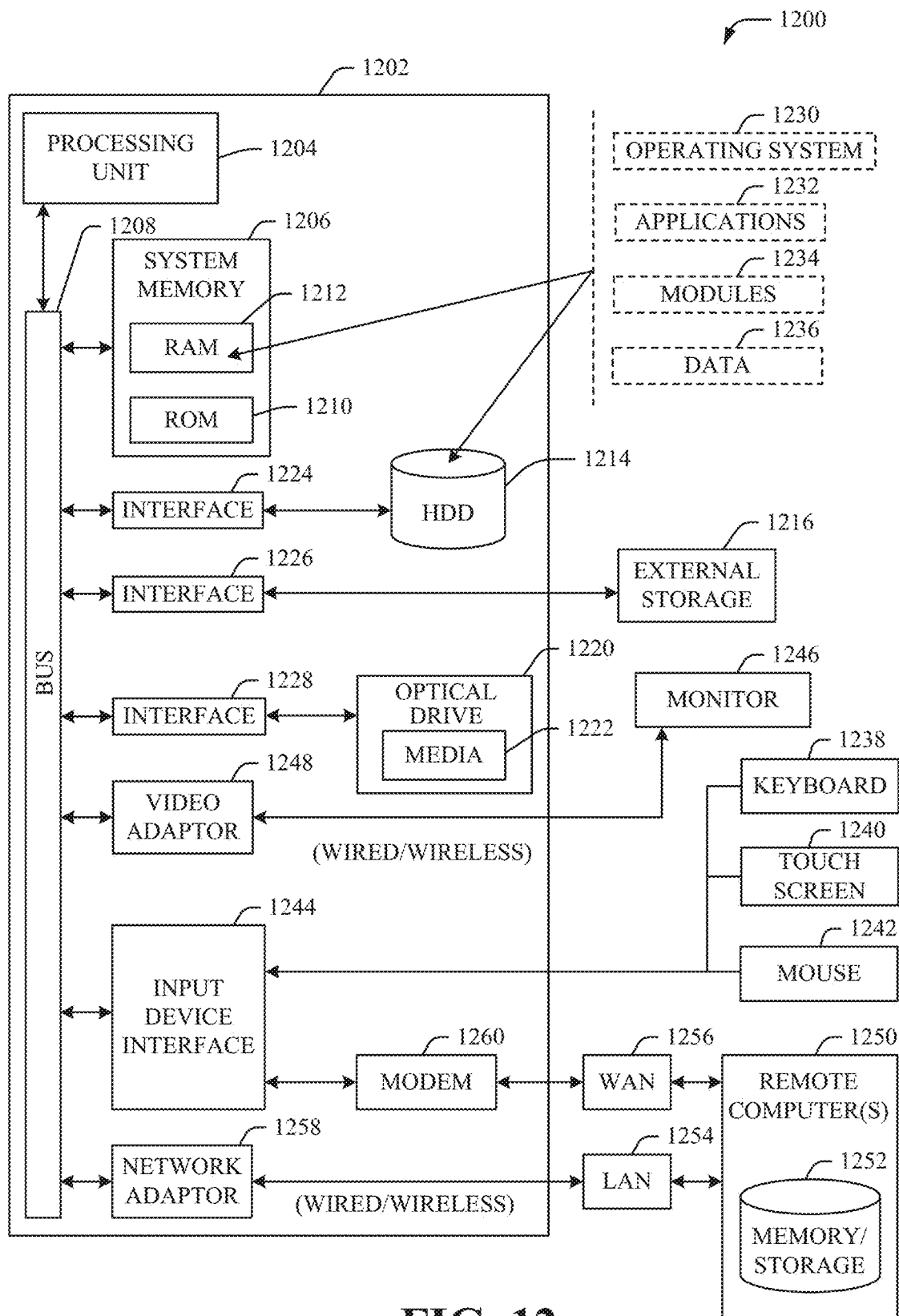
FIG. 12 illustrates an example block diagram of a computer that can be operable to execute processes and methods, in accordance with various aspects and embodiments of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from media 1222 such as a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 12 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   receiving, by an intermediate mobile device comprising a processor, a data packet from a transmitter mobile device, the data packet associated with location data representing a transmitter location of the transmitter mobile device and a receiver location of a receiver mobile device;
   based on the location data representing the transmitter location, the receiver location, and an intermediate location of the intermediate mobile device:
      determining, by the intermediate mobile device, a shape of a defined area surrounding a line of sight communication path from the transmitter mobile device to the receiver mobile device based on battery data of the intermediate mobile device, and
      determining, by the intermediate mobile device, that the intermediate mobile device is within the defined area surrounding the line of sight communication path;
   determining, by the intermediate mobile device, that the data packet is to be retransmitted by the intermediate mobile device; and
   in response to the determining that the intermediate mobile device is located within the defined area surrounding the line of sight communication path and that the data packet is to be retransmitted by the intermediate mobile device, retransmitting, by the intermediate mobile device, the data packet from the intermediate mobile device on a predetermined radio resource.

2. The method of claim 1, wherein the receiving of the location data representing the transmitter location of the transmitter mobile device and the receiver location of the receiver mobile device comprises receiving first coordinates of the transmitter mobile device and second coordinates of the receiver mobile device.

3. The method of claim 1, wherein the receiving of the location data representing the transmitter location of the transmitter mobile device and the receiver location of the receiver mobile device comprises receiving area identification information.

4. The method of claim 1, wherein the receiving of the location data representing the transmitter location of the transmitter mobile device and the receiver location of the receiver mobile device comprises receiving the location data in conjunction with receiving the data packet.

5. The method of claim 1, wherein the predetermined radio resource is received from the transmitter mobile device in a control channel or in conjunction with receiving the data packet, and wherein the predetermined radio resource is indicated to be used as a radio resource for retransmission by one or more intermediate mobile devices.

6. The method of claim 1, wherein the receiving of the location data representing the transmitter location of the transmitter mobile device and the receiver location of the receiver mobile device comprises receiving the location data via a control channel.

7. The method of claim 1, wherein the receiving of the data packet from the transmitter mobile device comprises receiving a broadcast data packet or receiving a group-cast data packet.

8. The method of claim 1, wherein the determining that the data packet is to be retransmitted by the intermediate mobile device comprises determining that the intermediate mobile device does not have alternative data to transmit.

9. The method of claim 1, wherein the determining that the data packet is to be retransmitted by the intermediate mobile device comprises determining that a retransmission repetition value associated with the data packet indicates that retransmission of the data packet is active.

10. A user equipment, comprising:
    a processor; and
    a memory that stores executable instructions that, when executed by the processor of a user equipment device, facilitate performance of operations, the operations comprising:
       receiving a communication message for potential retransmission by the user equipment, the communication message associated with location data;
       shaping a defined area surrounding a line of sight communications path between a transmitter device and a receiver device based on a traffic type corresponding to the communication message;
       determining, from the location data, that the user equipment is located in the defined area surrounding the line of sight communications path; and
       in response to the determining that the user equipment is located in the defined area surrounding the line of sight communications path, retransmitting the communication message.

11. The user equipment of claim 10, wherein the location data comprises first coordinates of the transmitter device and second coordinates of the receiver device, and wherein the determining that the user equipment is in the defined area surrounding the line of sight communications path comprises evaluating the first and second coordinates relative to a current location of the user equipment.

12. The user equipment of claim 10, wherein the location data comprises area information, and wherein the determining that the user equipment is in the defined area surrounding the line of sight communications path comprises determining that the user equipment is at a current location corresponding to the area information.

13. The user equipment of claim 10, wherein the operations further comprise, obtaining received repetition data in association with the communication message, determining from the received repetition data that the communication message is intended to be retransmitted at least one more time and, in conjunction with the retransmitting the communication message, modifying the received repetition data into modified repetition data that indicates that the communication message is intended for retransmission one fewer time than was indicated in the received repetition data.

14. The user equipment of claim 10, wherein the operations further comprise, based on the location data, sweeping a reduced number of available beams to select a beam pair link for the retransmitting of the communication message.

15. A non-transitory machine-readable medium, comprising executable instructions that, when executed by a processor of a first user equipment of a wireless communication system, facilitate performance of operations, the operations comprising:
- receiving a communication message, the communication message associated with location information and received repetition data;
- determining, based on the received repetition data, that the communication message is intended for retransmission;
- determining, based on the location information and a current location of the first user equipment, that the communication message satisfies retransmission policy data of the first user equipment, comprising:
  - shaping a defined area associated with a communications path between a second user equipment that initiated the communication message and a third user equipment that is an intended recipient of the communication message based on information related to pending data packet transmission of the first user equipment, and
  - determining that the current location of the first user equipment is within the defined area associated with communications path; and
- in response to the determining that the communication message is intended for retransmission and the determining that the communication message satisfies the retransmission policy data of the first user equipment, retransmitting the communication message.

16. The non-transitory machine-readable medium of claim 15, wherein the retransmitting comprises broadcasting the communication message.

17. The non-transitory machine-readable medium of claim 15, wherein the location information corresponds to a transmitter location of the second user equipment and a receiver location of the third user equipment.

18. The non-transitory machine-readable medium of claim 15, wherein the receiving of the communication message comprises receiving a broadcast data packet or receiving a group-cast data packet.

19. The non-transitory machine-readable medium of claim 15, wherein the determining that the communication message satisfies the retransmission policy data of the first user equipment comprises determining that the first user equipment does not have alternative data to transmit.

20. The non-transitory machine-readable medium of claim 15, wherein the determining that the communication message satisfies the retransmission policy data of the first user equipment comprises determining that a retransmission repetition value associated with the communication message indicates that retransmission of the communication message is active.

* * * * *